United States Patent [19]

Clear

[11] 4,289,632

[45] Sep. 15, 1981

[54] LOST CIRCULATION MATERIAL FOR SEALING PERMEABLE FORMATIONS

[75] Inventor: Elmer E. Clear, Bartlesville, Okla.

[73] Assignee: Phillips Petroleum Company, Bartlesville, Okla.

[21] Appl. No.: 77,215

[22] Filed: Sep. 20, 1979

[51] Int. Cl.³ .......................... C09K 7/02; C09K 7/06
[52] U.S. Cl. ............................. 252/8.5 LC; 175/72; 252/8.5 M
[58] Field of Search .......... 252/8.5 LC, 8.5 R, 8.5 M; 175/72

[56] References Cited

U.S. PATENT DOCUMENTS

| | | | |
|---|---|---|---|
| 2,064,936 | 12/1936 | McQuiston | 175/72 X |
| 2,119,829 | 6/1938 | Parsons | 252/8.5 |
| 2,691,629 | 10/1954 | Stoner | 252/8.5 |
| 2,739,940 | 3/1956 | Barrett | 252/8.5 |
| 3,208,523 | 9/1965 | Coyle et al. | 252/8.5 X |
| 3,231,399 | 1/1966 | Stookey | 106/39 |
| 3,253,664 | 5/1966 | Sauber et al | 175/72 |
| 3,325,403 | 6/1967 | Sauber et al. | 252/8.5 |
| 3,380,542 | 4/1968 | Clear | 175/72 |

OTHER PUBLICATIONS

Diaseal M Lost Circulation Material: Properties, Uses and Applications, Publication by Drilling Specialties Co., Bartlesville, OK.
Diaseal M Lost Circulation Material: Pattern for a Successful Squeeze, Publication by Drilling Specialties Co., Bartlesville, OK.
Diaseal M Lost Circulation Squeeze, Publication by Drilling Specialties Co., Bartlesville, OK.

Primary Examiner—Herbert B. Guynn

[57] ABSTRACT

A composition of matter and a method of making is provided for preparing slurries to seal permeable earth formations encountered in the drilling of wells. The composition of matter comprises finely divided paper, diatomaceous earth, and in a further embodiment, lime. Slurries of the composition of matter can be prepared using fresh water or salt water to form a water-based lost circulation fluid, or using oil to form an oil-based lost circulation fluid. A slug of the slurry is spotted at the locus of the permeable formation and defluidized to form a formation seal on which a mud sheath is then deposited.

10 Claims, No Drawings

LOST CIRCULATION MATERIAL FOR SEALING PERMEABLE FORMATIONS

The invention relates to a composition of matter for sealing permeable formations, particularly such formations in the earth which are encountered in the drilling of a well. In other aspects the invention relates to such a composition of matter employing a nonasbestos suspending agent and to methods of making such compositions of matter. In yet other aspects the invention relates to slurries prepared by mixing said composition with water, either fresh water or salt water, or with oil, and to methods of making such slurries. In yet further aspects the invention relates to methods of sealing permeable formations employing such slurries.

In the drilling of a well by the rotary method, a drilling fluid or mud is circulated into and out of the well bore as a necessary step in the operation. The drilling fluid or mud serves to cool and lubricate the bit, to carry cuttings to the surface, to support at least part of the weight of the drill pipe and drill bit, to provide a hydrostatic pressure head for prevention of caving of the walls of the well bore, to deposit on the surface of the well bore a mud filter cake which acts as a thin semi-impervious layer to prevent undue passage therethrough of fluids, and to perform other functions known in the drilling art. It is important that the drilling mud exhibit a relatively low rate of filtration or fluid loss in addition to having desirable rheological properties such as viscosity and gel strengths. It is also important that the drilling fluid system be kept as simple and inexpensive as possible in order to avoid undue expense in the drilling of a well.

When drilling through porous or fractured formations or other formations having a relatively high porosity or permeability to the drilling fluid, it sometimes occurs that the drilling fluid is lost to the surrounding formation resulting in a condition known as "lost circulation" wherein the drilling fluid passes into the permeable "thief" formation at such rate that circulation is greatly reduced or even terminated. In such cases the drilling of the well must be stopped and the condition corrected before drilling can be continued. If the condition of lost circulation cannot be corrected, it is often necessary to abandon the well.

Various methods and means have been used to restore circulation of the drilling fluid or mud when a lost circulation condition has occurred and such methods usually entail the addition of "lost circulation" materials or formation sealing agents to a drilling fluid to thereby form a lost circulation material fluid, hereinafter referred to as a LCM fluid or LCM mud, which when properly treated will form a formation seal to prevent further loss of circulation.

In general, formation sealing agents may be classified either as surface plugging, interstitial bridging, or a combination of plugging and bridging. Various formation sealing agents have heretofore been used in the art to form formation seals and/or filter cakes on the wall of a well bore. These include sugar cane fibers or bagasse, flax, straw, ground hemp, shredded paper, paper pulp, cellophane strips, ground plastics, mica flakes, expanded perlite, silica slag, diatomaceous earth, ground fir bark, ground redwood bark and fibers, grape extraction residue, cottonseed hulls, cotton bolls, ginned cotton fibers, linters, and the like. As can be appreciated, many known fibrous materials have been used in drilling mud compositions as formation sealing agents to seal high permeability "thief" formations in attempts to restore circulation of the drilling fluid when a lost circulation condition has been encountered.

Most operators are in agreement on the following points regarding lost circulation: (1) the majority of drilling mud losses are in fractured or vugular formations; (2) fractures are often induced by poor drilling practices; (3) to overcome this type of circulation loss, a seal must be accomplished within the formation, not merely on the face of the well bore; (4) the more fluid pumped into the loss zone, the more aggravated the problem becomes; (5) bridging may be accomplished by relatively coarse lost circulation materials, but relatively fine solids are needed to form a permanent seal; (6) the lower the water loss of a fluid brine pumped into a fracture the more likely it is that the fracture will be extended rather than sealed.

Factors of importance in LCM fluids include plastic viscosity (PV), yield point (YP), and water loss (API WL).

As is known, the viscosity of a fluid is its internal resistance to flow and is measured in centipoise units. Water at room temperature has a viscosity, for example, of about one centipoise. The coefficient of viscosity of a normal homogeneous fluid at a given temperature and pressure is a constant for that fluid and independent of the rate of shear or velocity gradient. Fluids obeying this rule are said to be Newtonian.

In colloids, and in fact all fluids which consist of two or more phases present at the same time, this coefficient is not a constant but is a function of the rate at which the fluid is sheared as well as of the relative concentration of the phases. These fluids are said to be non-Newtonian and include such fluids as drilling fluids and LCM fluids in which two or more phases are present at the same time.

Such non-Newtonian fluids frequently exhibit plastic flow, a rheological phenomenon in which flowing behavior of the material occurs after the applied stress reaches a critical value or yield point (YP). Yield points in drilling muds and LCM fluids are frequently expressed in units of pounds per 100 square feet. The yield point is a function of the internal structure of the fluid.

In non-Newtonian fluids such as drilling muds, after the critical value or yield point (YP) is achieved, the rate of flow or rate of shear typically increases with an increase in the pressure causing flow or shearing stress. The slope or rate of change of the rate of flow or rate of shear to the pressure causing flow or shearing stress, known as plastic viscosity (PV), is analogous to viscosity in Newtonian fluids and is similarly measured in centipoise units.

Generally, in LCM fluids, it is desirable that the yield point (YP) be above a minimum value to adequately suspend the lost circulation materials, the weighting materials, for example, barite and the like, if any are present, and any other components, for example, lime, which can be used in LCM fluids. Suspending agents, for example, asbestos fibers, have been employed to increase the yield point of the LCM fluid without unduly increasing its viscosity. Such suspending agents preferably act to suspend or prevent settling out of the particulate matter without unduly increasing plastic viscosity or unduly decreasing fluid loss rates. Generally, in order to serve satisfactorily as a suspending agent in LCM fluids it is currently preferred that the resulting fluid have a yield point of at least greater than about 5 pounds per 100 square feet. Materials with yield point values below this currently preferred minimum value have insufficient suspending ability to adequately suspend the components of drilling fluids including lost circulation materials, weighting materials, and the like. For unweighted systems, it is generally currently preferred that the yield point be less than about 75 lb per 100 square feet to facilitate pumping. A presently preferred range is from about 10 to about 30 lb per 100 square feet.

Generally, in LCM fluids, it is desirable that the mud have a relatively low plastic viscosity to facilitate handling and minimize load on the pumps used in handling the slurries. Increased plastic viscosity necessitates excessive pump pressures to inject the LCM fluid. For unweighted systems, a currently preferred range is from about 5 to about 40 centipoise, more preferably from about 10 to about 25 centipoise.

Another factor of importance in LCM fluids is fluid loss, for example, water loss. A high fluid loss rate is desirable so that when a high fluid loss-high solids slurry such as that in accordance with the instant invention is placed within the zone of loss in the well, the mobile phase of the fluid rapidly enters the surrounding formation, thereby depositing a permeable filter cake or formation seal, which can then be sealed by mud solids. In general, the higher the rate of fluid loss, the thicker the filter cake deposit in a given length of time, and the more effective the LCM fluid will be. It will be appreciated that fluid loss is preferably as high as possible while maintaining other properties in the desired ranges. For unweighted systems, a currently preferred range is from about 500 to about 1500 ml/30 min.

A particularly satisfactory lost circulation material to restore lost circulation in drilling wells is disclosed in U.S. Patent 3,253,664. The composition therein disclosed comprises diatomaceous earth or diatomite blended with lime and asbestos fiber slurried with water or oil to form LCM fluids. The asbestos fiber functions at least in part as a suspending agent to suspend the formation sealing agents such as diatomaceous earth and other materials such as barite to keep the slurry from settling in the pits. However, asbestos fibers are subject to current environmental objection and dispute, and it is desirable to employ an environmentally nonobjectionable material as a suspending agent as an alternative to asbestos fibers.

It is thus currently desirable that an LCM fluid be characterized by: (1) high fluid loss; (2) high fine solids content; (3) appreciable yield points to suspend such fines and other materials, for example, weighting materials such as barite and the like; (4) relatively low plastic viscosity to facilitate pumping and handling; and (5) a composition of matter which, unlike asbestos, is not subject to current environmental objection.

An object of this invention is a method of making a composition of matter and the thus made composition of matter which can be used to correct lost circulation encountered in drilling a well. Another object is a slurry and a method of making the slurry which can be used to correct a lost circulation condition. Another object of this invention is a method of sealing a thief formation to correct a lost circulation condition. Another object of this invention is such a composition using a suspending agent which gives appreciable yield point values. Still another object of this invention is such a composition which will form a stable slurry having relatively low plastic viscosity and relatively high fluid loss properties in either fresh or salt water-based or oil-based systems. Yet another object is such a composition which employs a material other than asbestos fibers as a suspending agent. Other objects and advantages of this invention will be apparent to one skilled in the art upon reading this disclosure including the detailed description of the invention.

Broadly my invention comprises a composition of matter comprising a mixture of finely divided paper and diatomaceous earth. In a further aspect the mixture comprises lime. In yet a further aspect, the mixture is slurried with water, either fresh water or salt water, to form a water-based LCM fluid. In another further aspect, the mixture is slurried with oil to form an oil-based LCM fluid. In other aspects, the invention comprises methods for making such a composition of matter and such slurries. In yet other aspects the LCM fluids prepared in accordance with the instant invention are employed in a method for sealing a permeable formation, said method broadly comprising preparing an LCM fluid by mixing a slurry in accordance with the instant invention, spotting a slug of said LCM fluid adjacent the permeable formation, defluidizing the LCM fluid to deposit a formation seal adjacent said permeable formation, and circulating a drilling mud to form a mud sheath on said formation seal.

As indicated, in one broad aspect the instant invention comprises a mixture of finely divided paper and diatomaceous earth. The finely divided paper can be in any form effective to act as a suspending agent for the diatomaceous earth, for example, finely shredded paper, groud paper, and the like. Particularly satisfactory results have been obtained using finely shredded paper. Such paper is available, for example, from Buckeye Mud Corporation, Midland, Tex., in fifty pound sacks. However, any suitable paper for suspending the diatomaceous earth, for example, ground paper from such as newspapers, can be employed in accordance a with the instant invention. The amount of paper employed is an amount effective to adequately suspend the other lost circulation materials, for example, diatomaceous earth, lime, nut shells, if present, and the like and other materials such as weighting materials, for example, barite and the like. Preferably, the amount of paper employed to stabilize the slurry is at least 2 percent by weight of the composition of my invention. Broadly, the amount of paper can range from about 2 percent by weight to about 30 percent by weight. A preferred range is from about 4 to about 16 percent by weight, more preferably from about 8 to about 12 percent by weight. A currently most preferred level is about 9% to about 11% paper by weight to provide excellent suspending activity for the diatomite without unduly increasing the viscosity or unduly restricting water loss.

Diatomaceous earth, also known as diatomite, infusorial earth, or kieselguhr, is composed of the silicaceous skeletons of diatoms. Diatomaceous earth is abundantly available and relatively inexpensive and is known in the art as a fluid permeable filter cake forming formation sealing agent. The diatomaceous earth functions as a high fines solid to assist in forming a permanent seal of permeable formations. The amount of diatomaceous earth employed in my invention comprises at least 70 percent by weight of said composition and broadly is in the range from about 70 weight percent to about 98 weight percent. A currently most preferred level is about 80% to about 85% by weight.

In a further aspect my invention comprises a composition of matter including lime (calcium hydroxide). The addition of a small amount of lime to a finely divided paper stabilized diatomite slurry improves the filtration rate with only a moderate increase in the yield point and viscosity of the slurry. A high water loss slurry is thus formed having a relatively low viscosity but having an appreciable yield point value as determined by API method RP 13B. Preferably, the lime can broadly range from about 0 to about 15 weight percent. More preferably the amount of lime can range from about 6 to about 12 weight percent and most preferably from about 8 to about 10 percent by weight of the mixture. When lime is employed in the composition, diatomaceous earth can be used broadly in a range from about 55 to about 98 percent by weight of said mixture, preferably in the range from about 72 to about 90 percent, and more preferably in the range of about 78 to about 86 percent by weight of the mixture. A currently most preferred level is about 80 to about 85 percent by weight for cost and convenience.

My invention also comprises a method of making my composition of matter comprising proportioning materials including finely divided paper, diatomaceous earth, and, optionally, lime, by weight in accordance with the above description of my composition of matter and mixing the thus proportioned materials to form a generally homogeneous mixture.

The composition of matter according to my invention can also be used to form a slurry (which slurry can be used as an LCM fluid) with water, either fresh water or salt water, or with oil. Slurries formed with water can be used as an LCM fluid to seal high permeability earthen formations encountered in drilling with a water based drilling fluid. Slurries formed with oil can be used as an LCM fluid to seal such permeable formations encountered in drilling with an oil-based drilling fluid.

As is known, the density of a drilling fluid is an important parameter. To prevent blow-out, the uncontrolled flow of fluids from the formation into the well, the drilling fluid must have a density effective to provide a greater pressure than that exerted by the formation fluids. However, densities must not be carried too high, because excessive hydrostatic pressures can cause further loss of circulation. Weighting materials to increase the density of drilling fluids are frequently added to such fluids, for example, ground barite, the widespread and common form of barium sulfate and the like can be used. Accordingly, the slurry prepared according to my invention can further comprise a weighting material such as ground barite and the like added to adjust the density of the lost circulation fluid to a desired level.

To further illustrate my invention, refer to Tables I and II for illustrative slurries prepared with water or oil respectively for lost circulation fluids with densities as indicated.

TABLE I

| Density Lb./Gal. | Lost Circulation Composition (Lbs.) | Barite[1] (Lbs.) | Water (Bbl.) |
|---|---|---|---|
| 9 | 50 | 0 | .87 |
| 10 | 50 | 60 | .84 |
| 11 | 47 | 120 | .80 |
| 12 | 42 | 180 | .77 |
| 13 | 39 | 230 | .74 |
| 14 | 35 | 290 | .70 |
| 15 | 31 | 350 | .67 |
| 16 | 28 | 400 | .63 |

TABLE I-continued

| Density Lb./Gal. | Lost Circulation Composition (Lbs.) | Barite[1] (Lbs.) | Water (Bbl.) |
|---|---|---|---|
| 17 | 25 | 460 | .60 |
| 18 | 22 | 520 | .56 |
| 19 | 17 | 580 | .52 |

[1]If saturated salt water is used, barite must be decreased 60 pounds per barrel.

TABLE II

| Density Lb./Gal. | Lost Circulation Material (50 lb. units) | Barite (Lbs.) | Oil[1] (Bbl.) |
|---|---|---|---|
| 8 | 88 | 3,800 | 88.0 |
| 9 | 82 | 8,800 | 85.0 |
| 10 | 76 | 13,800 | 83.0 |
| 11 | 70 | 18,800 | 80.5 |
| 12 | 65 | 23,800 | 77.0 |
| 13 | 60 | 29,000 | 74.5 |
| 14 | 54 | 34,300 | 72.0 |
| 15 | 48 | 39,700 | 69.5 |
| 16 | 43 | 45,200 | 67.0 |
| 17 | 38 | 50,800 | 64.5 |
| 18 | 33 | 58,500 | 61.0 |

[1]Because of variations of oil and/or barite, pilot tests should be made to determine exact formulations. If slurry becomes too thick, add up to 1 lb/bbl. oil wetting agent to thin.

If desired, conventional bridging materials can be added to the above formulations. For example, 25 pounds per barrel of nut shells can be used without other change. If fluid absorbent lost circulation materials are used, the slurry viscosity will increase. The slurry is effective without conventional lost circulation materials. Although Tables I and II are included to illustrate the use of my composition of matter, my invention is not to be considered limited thereby but by the claims hereinbelow appended.

As disclosed in Table I, slurries prepared in accordance with the instant invention can broadly comprise a composition of matter in accordance with the instant invention in the range from about 10 to about 50 pounds per barrel of slurry, and a fluid selected from the group consisting of fresh water and salt water, said fluid comprising in the range of about 0.5 to about 0.9 barrel of fluid per barrel of slurry. In a further aspect, such slurries can comprise in the range of about zero to about 600 pounds of ground barite per barrel of slurry.

As disclosed in Table II, slurries prepared in accordance with another aspect of the instant invention can broadly comprise a composition of matter in accordance with the instant invention in the range of about 1500 pounds to about 4500 poounds per 100 barrels of slurry, oil comprising in the range of about 60 to about 90 barrels of oil per 100 barrels of slurry, and ground barite comprising in the range of about 3,500 to about 57,000 pounds of ground barite per 100 barrels of slurry.

As indicated above, my invention also comprises methods of making my slurries. A method of making water based slurry comprises mixing my composition of matter in the range of about 10 to about 50 pounds per barrel of slurry, with a fluid selected from the group consisting of fresh water and salt water in the range of about 0.5 to about 0.9 barrel of fluid per barrel of slurry. In a further aspect, the method comprises mixing ground barite in an amount effective for adequate weighting for the particular application with my composition of matter and with the fluid. Preferably, the barite ranges from about 0 to about 600 pounds per barrel of slurry. A method of making an oil based slurry comprises mixing my composition of matter in the range of about 1500 to about 4500 pounds per 100 barrels of slurry, with oil in the range from about 70 barrels to about 90 barrels per 100 barrels of slurry, and with ground barite in an amount effective for adequate weighting for the particular application. Preferably, the barite ranges from about 3500 to about 57,000 pounds per 100 barrels of slurry for weighted muds.

As indicated above, in another broad aspect, the instant invention relates to a method of sealing permeable formations encountered in the drilling of a well by employing slurries made in accordance with some aspects of the instant invention.

The method comprises preparing an LCM fluid, spotting a slug of the thus prepared LCM fluid adjacent a permeable formation in a well bore, defluidizing the thus spotted LCM fluid to deposit a formation seal adjacent said permeable formation, and circulating a drilling mud to form a mud sheath on said formation seal.

The LCM fluid comprises slurries prepared according to the instant invention as hereinabove set forth.

Spotting a slug of the thus prepared LCM fluid adjacent the permeable formation is accomplished by methods known in the art. For example, the "thief" or permeable formation will usually be at or near the bottom of the well bore because when the permeable formation is encountered the formation will immediately begin to take drilling fluid and the loss of drilling fluid will increase as the permeable formation is penetrated eventually resulting in a lost circulation condition. In such situations the LCM fluid can be spotted adjacent the permeable formation by pumping a slug of the slurry down and out of the drill pipe as is known in the art. It may be, however, that the permeable formation is at a point farther up in the well bore and such condition can result, for example, from failure of a previous seal. In such cases, the drill pipe can be raised as is known in the art so that the slug of the LCM fluid is deposited adjacent the permeable formation.

The volume of the slug of LCM fluid which is spotted adjacent the permeable formation can range from less than that of the open hole to more than double that of the open hole. Excellent results have been obtained when an LCM slug has a volume at least double that of the open hole and that amount is currently preferred.

Defluidizing the LCM fluid can be accomplished either by hydrostatic pressure or by exerting a low squeeze pressure as is known in the art. Hydrostatic pressure will complete the seal. However, low squeeze pressure is highly desirable because incipient fractures or other areas of high permeability can be opened thereby and plugged immediately, thus reinforcing the zone and reducing or avoiding the possibility of later losses. The failure to use low squeeze pressure is the reason that, in many cases, a weak zone will continue to post a lost circulation problem after the original loss has been overcome by conventional lost circulation remedies and drilling has been resumed. To be most effective then, as much of the permeable zone as possible should be penetrated before applying the method of the instant invention.

After the defluidizing is completed, a drilling mud is recirculated through the well bore to deposit a mud sheath on the formation seal and drilling is resumed.

To further illustrate my invention please refer to the following examples.

EXAMPLE I

A series of runs were made to determine plastic viscosity (PV), yield point (YP) and water loss (API WL) values of LCM fluids prepared in accordance with the instant invention. These values were obtained employing standard API procedures as described in API RP 13B except as otherwise set forth. These data were obtained in the following manner. The proper amount of tap water was added to a jar, for example, a Mason jar. While the water was being stirred, at low power on a Hamilton-Beach Drink Mixer equipped with a Variac control, the dry ingredients were added in the order and amounts listed in Table III below, except that in the weighted slurries the barite wasa added last. In unweighted slurries, the materials listed were added to 350 milliliters (ml) of water. In weighted slurries, the amount of water used was sufficient to give 350 ml (i.e., 1 lab barrel) of finished product. After all of the dry materials had been added to the water, stirring of the resulting slurry was continued for 2 minutes at 60% power to simulate the rather poor mixing normally available in the field. In the field the dry ingredients are preblended and added to water. In the laboratory, the ingredients are added separately to facilitate accurate measurement of the ingredients.

After stirring the Mason jar was transferred to a Fann VG meter where the flow properties were measured. The slurry was then poured into a standard API filter press and filtered under 100 psig nitrogen pressure until the slurry was dehydrated. The time of dehydration in minutes and the quantity of fluid loss in milliliters was measured and recorded. The filter press was then disassembled and the filter cake thickness measured. The data were used to compute the PV, YP, and API Water Loss (API WL) values set forth in Table III below. On high fluid loss slurries the amount of fluid lost (Qm) at a time of dehydration (t) is measured. The amount of fluid that would have been lost in 30 minutes (Qc) is then calculated from the following relationship:

$$Qc = Qm \cdot \frac{\sqrt{30}}{\sqrt{t}} = Qm \cdot \frac{5.48}{\sqrt{t}}$$

The "Hamilton-Beach Drink Mixer" is a Model 937-1 Drink Mixer manufactured by Hamilton-Beach Division of Scovill and available through Fisher Scientific Company, Dallas, Tex. The "Variac control" is a Variableautotransformer, Type 3 PN 1010, manufactured by Staco, Inc., Dayton, Ohio, and available through Fisher Scientific Company, Dallas, Tex. The "Fann VG Meter" is a Fann Model 35 Viscometer, manufactured and distributed by Fann Instrument Corp., Box 4211, Houston, Tex.

TABLE III

| Run | Blend (Weight Percent) | | | | PV/YP | API WL (Ml/30 Min. Calc.) | Cake Thickness | |
|---|---|---|---|---|---|---|---|---|
| | Diatomite | Paper | Lime | Barite | | | mm. | Inch/32 |
| 1 | 86 | 10 | 4 | 0 | 14/10 | 1388 | 27 | 34 |
| 2 | 90 | 8 | 2 | 0 | 7/13 | 1365 | 22.5 | 28 |
| 3 | 85 | 10 | 5 | 14 lb/gal$^a$ | 15/52 | 502 | 34 | 43 |

TABLE III-continued

| | Blend (Weight Percent) | | | | | API WL | Cake Thickness | |
|---|---|---|---|---|---|---|---|---|
| Run | Diatomite | Paper | Lime | Barite | PV/YP | (Ml/30 Min. Calc.) | mm. | Inch/32 |
| 4 | 82 | 10 | 8 | 14 lb/gal[a] | 13/45 | 556 | 36 | 45 |
| 5 | 85 | 10 | 5 | 16 lb/gal[b] | 15/65 | 435 | 40 | 50 |
| 6 | 82 | 10 | 8 | 16 lb/gal[b] | 15/66 | 461 | 38 | 48 |

[a]Weighted to 14 lb/gal by addition of barite.
[b]Weighted to 16 lb/gal by addition of barite.

EXAMPLE II

A series of runs was performed with lost circulation materials set out in Table IV to determine usefulness as suspending agents. The procedures of Example I were employed except, for each run, that a lost circulation additive as designated in Table IV replaces the finely divided paper of Example I.

TABLE IV

| | | Blend (Wt. %) | | | |
|---|---|---|---|---|---|
| Run | Additive | Diatomite | Lime | Additive | PV/YP |
| 7 | Corncobs | 86 | 4 | 10 | 5/0 |
| 8 | Corncobs | 86 | 2 | 12 | 5/0 |
| 9 | Wood | 86 | 4 | 10 | 6/0 |
| 10 | Wood | 86 | 2 | 12 | 7/0 |
| 11 | Cotton fiber | 72 | 8 | 20 | 35/0 |
| 12 | Cellulose fiber | 86 | 4 | 10 | 7/2 |

No sample muds weighted with barite were run because none of the samples had sufficient suspending ability to adequately suspend the barite.

Examples I and II further illustrate the present invention. Runs 1 and 2 of Example I show that appreciable yield point values were obtained with the mixture according to the instant invention. Surprisingly when other conventional lost circulation additives were tried as in runs 7 through 12, none of the other lost circulation additives showed appreciable suspending ability. This is evidenced by the zero yield point (YP) values for runs 7 through 12. Preferably the yield point should be high enough to prevent settling of solids and fluid separation. The yield point of the slurry should be at least greater than about 5 lb/100 square feet for adequate suspension.

Runs 3 through 6 demonstrate that the mixture according to the instant invention has sufficient suspending ability to suspend barite to form weighted muds. By contrast, the other lost circulation materials tried in runs 7 through 12 lacked sufficient suspending ability to form weighted muds.

A comparison of run 3 with run 4 and a comparison of run 5 with run 6 indicates that increasing the weight percentage of lime can increase water loss (API WL) rates without significantly adversely affecting plastic viscosity (PV) and yield point (YP) characteristics.

Although the invention has been illustrated by reference to preferred ranges and working examples, the invention is not to be considered limited thereby but by the claims set out herein below.

I claim:

1. A composition of matter for sealing permeable formations comprising diatomaceous earth and a suspending agent wherein:
    the suspending agent consisting of finely divided paper present in an amount in the range of about 2 to about 30 percent by weight of said mixture said diatomaceous earth being present in an amount of from about 70 to about 98 percent by weight of said mixture.

2. A composition of matter as in claim 1 wherein:
    said finely divided paper comprises in the range of about 4 to about 16 percent by weight of said mixture.

3. A composition of matter as in claim 1 wherein:
    said finely divided paper comprises about 9 to about 11 percent by weight of said mixture.

4. A composition of matter for sealing permeable formations comprising a mixture comprising a suspending agent, diatomaceous earth, and lime wherein the suspending agent consists of finely divided paper in an amount in the amount of about 2 to about 30 percent by weight of the mixture effective to suspend the diatomaceous earth, and, if present, other lost circulation materials, when the mixture is used in lost circulation material fluids, said diatomaceous earth being present in an amount of from about 55 to about 98 percent by weight of the mixture and said lime is present in an amount of from about 0 to about 15 percent by weight of said mixture.

5. A composition of matter as in claim 5 wherein:
    said finely divided paper comprises in the range of about 4 to about 16 percent by weight of said mixture;
    said diatomaceous earth comprises in the range of about 72 to about 90 percent by weight of said mixture; and
    said lime comprises in the range of about 6 to about 12 percent by weight of said mixture.

6. A composition of matter as in claim 4 wherein:
    said finely divided paper comprises in the range of from about 8 to about 12 percent by weight of said mixture;
    said diatomaceous earth comprises in the range of about 78 to about 86 percent by weight of said mixture; and
    said lime comprises in the range of from about 8 to about 10 percent by weight of said mixture.

7. A composition of matter as in claim 4 wherein:
    said finely divided paper comprises about 9 to about 11 percent by weight of said mixture;
    said diatomaceous earth comprises about 80 to about 85 percent by weight of said mixture; and
    said lime comprises about 8 to about 10 percent by weight of said mixture.

8. A water-base slurry for sealing permeable earth formations comprising:
    a composition of matter as in claim 1, 2, 3, 4, 5, 6, or 7, said composition comprising in the range of about 10 to about 50 pounds per barrel of slurry; and
    a fluid selected from the group consisting of fresh water and salt water, said fluid comprising in the range of about 0.5 to about 0.9 barrels per barrel of slurry.

9. A slurry as in claim 8 further comprising:

ground barite in the range of about 0 to about 600 pounds per barrel of slurry.

10. An oil-base slurry for sealing permeable formations comprising:
a composition of matter as in claim 1, 2, 3, 4, 5, 6, or 7, said composition of matter comprising in the range of about 1500 to about 4500 pounds per 100 barrels of slurry;

oil comprising in the range from about 70 to about 90 barrels per 100 barrels of slurry; and ground barite comprising in the range of about 3500 to about 57,000 pounds per 100 barrels of slurry.

* * * * *